P. J. TIMBERLAKE.
JAR HOLDER.
APPLICATION FILED SEPT. 10, 1918.
1,330,663.
Patented Feb. 10, 1920.
2 SHEETS—SHEET 1.
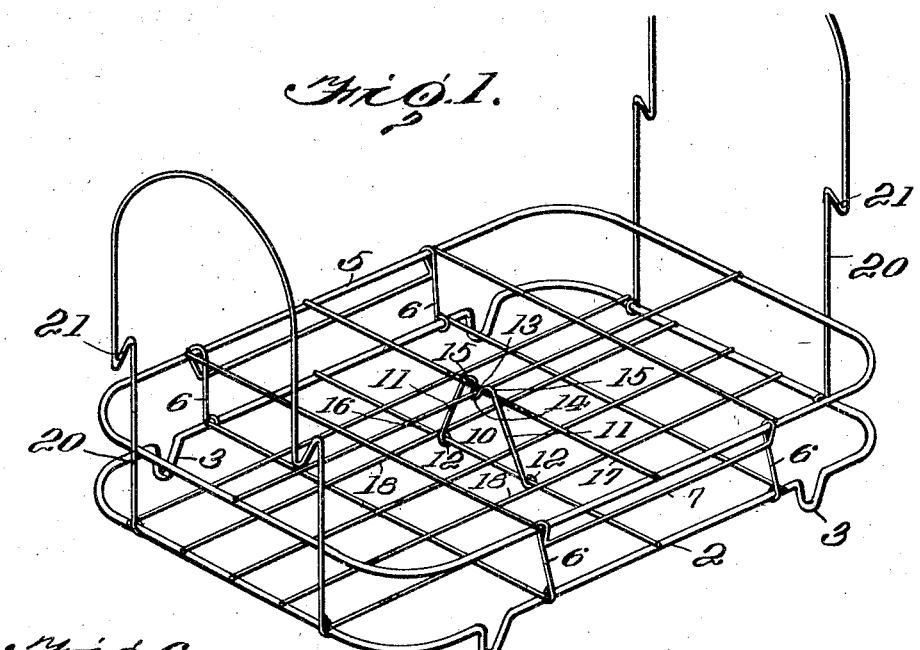
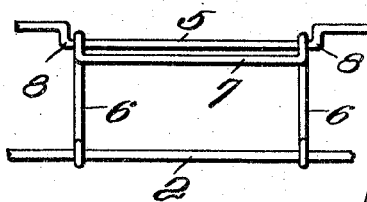
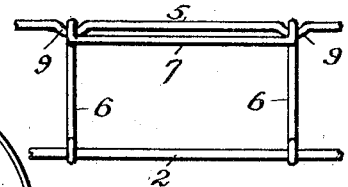
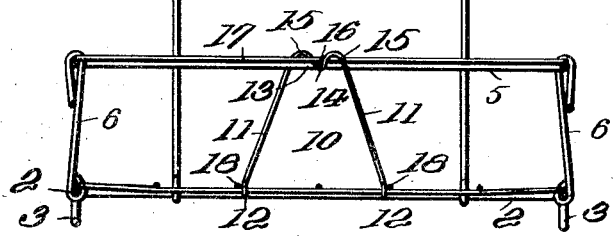
Inventor
Paul J. Timberlake
By
John S. Barker
Attorney P. J. TIMBERLAKE.
JAR HOLDER.
APPLICATION FILED SEPT. 10, 1918.
1,330,663.
Patented Feb. 10, 1920.
2 SHEETS—SHEET 2.
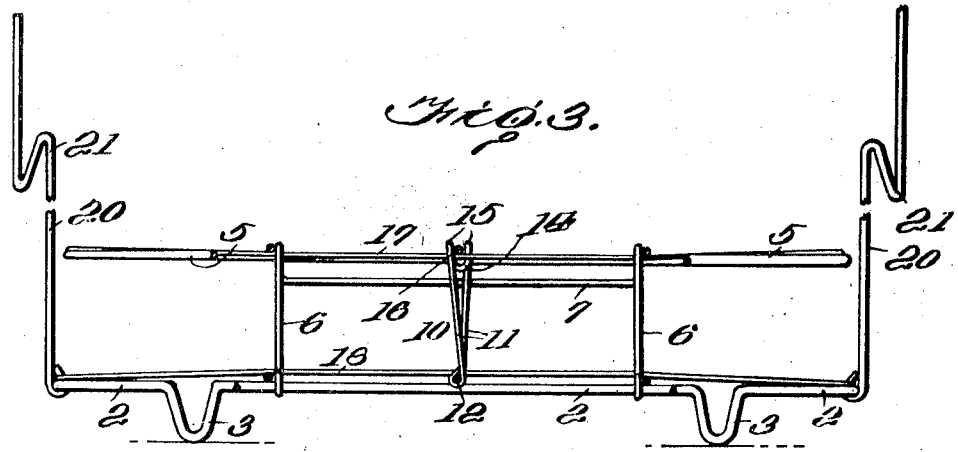
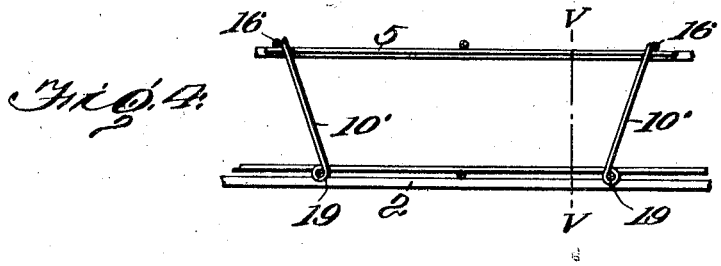
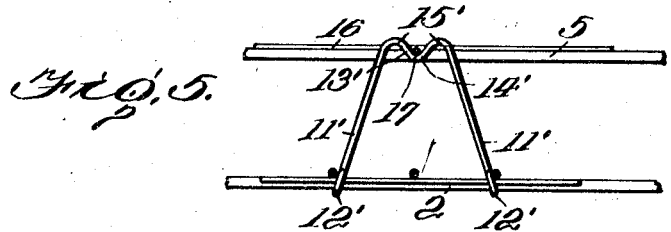
Inventor
Paul J. Timberlake
By
John S. Barker
Attorney

UNITED STATES PATENT OFFICE.

PAUL J. TIMBERLAKE, OF JACKSON, MICHIGAN.

JAR-HOLDER.

1,330,663.　　　　　Specification of Letters Patent.　　Patented Feb. 10, 1920.

Application filed September 10, 1918. Serial No. 253,433.

*To all whom it may concern:*

Be it known that I, PAUL J. TIMBERLAKE, a citizen of the United States, residing at Jackson, in the county of Jackson and State of Michigan, have invented certain new and useful Improvements in Jar-Holders, of which the following is a specification.

My invention consists of an improved foldable tray, preferably formed from wire, and intended to be used in holding jars for fruit or vegetables while being heated in the process of canning.

In the accompanying drawings, Figure 1 is a perspective view of the preferred form of my invention set up in position to receive the jars. Fig. 2 is a transverse sectional view of the tray. Fig. 3 is a side elevation with parts broken away and parts in section. Fig. 4 is a fragmentary longitudinal view similar to Fig. 3 illustrating a different embodiment of the invention. Fig. 5 is a fragmentary transverse section on the line V V of Fig. 4. Figs. 6 and 7 are detail views illustrating different ways of connecting the hinges with the parts they unite. Fig. 8 is a transverse sectional view of the tray, the parts being folded as they are for the purposes of storage and shipment.

In the drawings 2 indicates a rack adapted to constitute a support for fruit jars. It may be of any desired size, as for instance one adapted to support eight quart jars, and is shaped to fit a vessel in which these are placed for cooking, for instance a wash boiler. It is preferably formed of wire, and has feet 3 that hold the rack above the surface on which it is supported. This feature of the invention is not new and may be of any usual or preferred construction.

5 designates a frame also preferably formed of wire and in outline corresponding with the rack 2. It is adapted to support and hold separated from each other the jars that may be placed upon the rack. When in use it is adapted to occupy a position parallel with and a proper distance above the rack 2 and is connected with the latter by hinges, so that it may be folded down upon the rack and substantially parallel therewith, as represented in Fig. 8, or made to occupy the position above and parallel with the rack, represented in Fig. 1.

The hinges are preferably arranged to unite the long sides of the rack 2 and frame 5, so that the frame folds sidewise, although the hinges could be arranged at the ends or shorter sides of the tray, in which event the folding would be in the direction of the length of the tray. The hinges preferably consist of a pair of connecting bars 6, 6 looped about the marginal wires of the frames 2 and 5, and united by a connecting pice 7, each hinge being formed preferably from a single piece of wire. The connecting pieces 7 give stiffness to the hinges and to the tray in a direction transverse to that on which the folding may take place. Thus, in the form of tray shown in Fig. 1, the connecting bars 7 of the hinges add stiffness to the tray in the direction of its length and effectively prevent any movement of the parts 2 and 5 relative to each other in a longitudinal direction. In the form of the invention illustrated in Fig. 1 the hinges are prevented from longitudinal movement along the marginal wires with which they are connected by the cross wires of the rack and holding frame respectively. Other means may be resorted to for holding the hinges in place, as for instance by bending one of the marginal wires with which the hinge is united, as represented at 8 in Fig. 6 or as at 9, 9 Fig. 7.

In order to positively hold the parts of the tray in position for use, with the frame 5 spaced from the rack, I employ a lock 10. I prefer to use but a single lock of the form shown in Figs. 1, 2, and 3, as that is sufficient for all practical purposes. The lock is formed of wire and consists essentially of a substantially U-shaped device hinged to one of the frames, 2 or 5, and arranged to have separable connection with the other. The preferred form of hinge has the legs 11, 11 hinged to a cross-bar of one of the frames, preferably to a cross-bar of the rack 2, as indicated at 12, 12, and a cross piece 13 connecting the legs 11, 11. The cross piece is bent to form a loop 14 adapted to receive a part of the upper frame 5. The connecting piece 13 preferably extends diagonally between the ends of the legs 11, which latter therefore lie in different planes, so that when raised into locking position the projections 15 on either side of the loop 14 may lie on opposite sides of the longitudinal wire 16 of the frame 5. The lock may be so hinged that when raised to locking position the intersection of the wires 16, 17 lies in the loop 14 and the projections 15 on opposite sides of the wire 16, thus securely holding the parts in the position indicated in Fig. 1 and forming an effective lock. The wires 16, 17 of the frame 5 have to be sprung a little to permit the lock to come to the position indicated, but the construction of the frame permits this. The hinged ends 12 of the lock may abut against the longitudinal wires 18 of the rack 2 as represented in Fig. 2, thus holding the lock in place. Instead of using a single lock, a pair may be employed as represented in Figs. 4 and 5, in which views the corresponding parts of the lock have the same reference characters as do the parts of the lock shown in Figs. 2 and 3, already described, but each with an added exponent, prime. In this arrangement the several parts of each lock element 10', except the loops 12', and including the legs 11' and the connecting piece 13' with its loop 14' and projections 15', may lie in a single plane. To insure an effective locking arrangement the wires 19 to which the locks 10' are hinged should not be directly below the wires 16 against which the upper or looped ends of the locks abut. In swinging the locks 10' 10' into position they cross the vertical and pass a little beyond the same, above the hinge wires 19, and occupy an inclined position when they come to rest abutting against the wires 16. The loops 14' should be so located, with reference to the wire 17, that the latter engages the looped part of the locks with some frictional force so that when occupying the positions shown in Fig. 4 they will be held and serve to securely hold the tray in open working condition.

20, 20 indicate handles at the ends of the tray. They may be of any usual or practical construction, those represented having intermediate loops 21 adapted to catch over the upper edge of the vessel into which the tray may be placed and hand pieces 22 above the loops.

A tray such as described is rigid when the parts are adjusted for use and yet may be easily folded into the condition represented in Fig. 8 for storage or shipment. In order to fold, the lock is first disengaged from the frame 5 and folded down upon the rack 2. The frame 5 is then folded close upon the rack and the handles 20 turned under the rack, the parts of which are then very compactly arranged.

It will be observed that the hinges 6 that unite the rack 2 and the supporting frame 5 are so related to each other and the parts they unite that the said rack and frame are always maintained in parallelism with each other whether the tray be set up for use as in Fig. 1 or folded for storage as represented in Fig. 8.

What I claim is:

1. A folding tray for jars comprising a supporting rack, a frame for holding the jars while supported on the rack, hinges uniting the rack and frame permitting the latter to either fold down upon the rack or to occupy a position above it and spaced therefrom and arranged to maintain the rack and frame substantially parallel whether spaced apart or folded together, and a lock for holding the said parts in spaced-apart position, the lock having an open loop adapted to permit it to embrace a part of the frame with which it is brought into engagement.

2. A folding tray for jars comprising a supporting rack, a frame for separating and holding the jars while supported on the rack having cross-bars, hinges uniting said rack and frame and permitting the frame to either fold down upon the rack or occupy a position above it and spaced therefrom, and a substantially U-shaped lock hinged to the rack, the cross connecting part of the lock being formed with a loop adapted to engage with a cross-bar of the frame to hold the latter spaced apart from the rack and also to hold the lock firmly in locking position.

3. A folding tray comprising a supporting rack, a holding and separating frame hinged thereto and having a cross-bar, and a lock for positively holding the frame spaced from the rack, the lock being of substantially U-shape, the legs of which are pivotally connected with the rack and are united at their ends by a diagonally disposed connecting piece formed with an intermediate loop adapted to engage with and embrace upon opposite sides a cross-bar of the frame.

4. A folding tray, comprising a wire supporting rack, a wire holding frame, hinges uniting the rack and frame permitting them to be spaced apart or to be folded one upon the other, each hinge formed of a single piece of wire having connecting bars looped about the wires of the rack and frame respectively, and a connecting piece between the looped connecting bars, the connecting piece serving to give stiffness to the hinge in a direction transverse to that on which the folding of the tray takes place.

PAUL J. TIMBERLAKE.